United States Patent [19]

Orzech

[11] Patent Number: 5,560,262
[45] Date of Patent: Oct. 1, 1996

[54] LOCKING SYSTEMS FOR ADJUSTABLE CAR SEATS

[75] Inventor: Udo Orzech, Wuppertal, Germany

[73] Assignee: Keiper Recaro GmbH & Co., Remscheid, Germany

[21] Appl. No.: 302,506

[22] Filed: Sep. 8, 1994

[30] Foreign Application Priority Data

Sep. 11, 1993 [DE] Germany .................... 43 30 870.8

[51] Int. Cl.$^6$ ..................................... B60N 2/08
[52] U.S. Cl. ............................. 74/527; 248/423
[58] Field of Search ................. 74/527; 248/423, 248/429, 430

[56] References Cited

U.S. PATENT DOCUMENTS

| | | | |
|---|---|---|---|
| 4,189,957 | 2/1980 | Gedig et al. | 74/535 |
| 4,508,386 | 4/1985 | Hofmann | 248/430 X |
| 4,712,759 | 12/1987 | Sugama et al. | 248/429 |

FOREIGN PATENT DOCUMENTS

| | | | |
|---|---|---|---|
| 858362 | of 1952 | Germany | 248/430 |
| 2729770 | 1/1979 | Germany . | |

*Primary Examiner*—Rodney H. Bonck
*Assistant Examiner*—Mary Ann Battista
*Attorney, Agent, or Firm*—Wigman, Cohen, Leitner & Myers, P.C.

[57] ABSTRACT

A locking system for adjustable car seats, in particular seats of motor vehicles. The system includes: a first row of notches (2), which extends in the direction of adjustment of the car seat and all of whose notches are designed the same and are spaced at equal intervals; a second row of notches (4), which extends parallel to the first row and all of whose notches are designed the same, have in the direction of adjustment of the car seat the dimension and the same distance from each other, like the notches (2) of the first row, and are offset in the direction of adjustment relative to the notches of the first row; and at least first and second locking bodies (6, 7), each of which in its locking position engages with a notch (2, 4) of the first or second row; all notches (2, 4) are designed as oblong holes extending in the direction of adjustment. The width of the oblong holes (4) of the second row is greater than the corresponding width of the oblong holes (2) of the first row, the width being measured at right angles to the direction of adjustment. At least that part of the locking body (6, 7) that engages with the oblong holes (2, 4) is designed as a bolt.

23 Claims, 2 Drawing Sheets

LOCKING SYSTEMS FOR ADJUSTABLE CAR SEATS

FIELD OF THE INVENTION

The invention relates to a locking system for adjustable car seats, in particular motor vehicle seats. With such a locking system, the parts that can be moved relative to each other during an adjustment, for example the seat that is adjustable in the longitudinal direction of the seat, and the car structure, carrying the seat, can be connected together with locking shapes, thus ensuring that in any selectable position at least one of the two locking bodies can fall into its locking position.

BACKGROUND OF THE INVENTION

In a known locking system of this kind (as described in DE 27 29 770 C2) two rows of notches in a channel are configured in such a manner that each notch is designed as a rectangular passage and lies in the transitional region from a yoke section to one of two adjacent legs. The two locking bodies are formed by the two arms of a Y-like, plate-shaped stamping, which can be swivelled around an axis extending parallel to the channel, and are slidable at right angles to the channel. For all notches the length measured in the longitudinal direction of the bar, thus the direction of adjustment, must correspond to the sum of the width of one of the webs, existing between two successive notches of the same row, and twice the value of the thickness of the stamping forming the locking bodies, said thickness being measured in the direction of adjustment.

SUMMARY OF THE INVENTION

Since as a rule the space, which is available for housing the notches and the locking bodies, is very small and especially in the case of an accident the forces increasing from the locking system can be very high, the invention addresses the problem of providing a locking system of the aforementioned kind, with which the available space and the available material volume can be utilized better than with the known system, in order to be able to absorb even greater forces or reduce the space requirement.

The solution according to the invention allows optimal utilization of the material of the component, for example a bar, provided with the two rows of oblong holes, and the bolt subjected to shear.

In a preferred embodiment the bolts are designed as round bolts and the corresponding ends of the oblong holes are designed to be semicircular, because in this manner tension peaks can be avoided and the load carrying ability of the web regions located between two successive notches is increased.

Especially advantageous is the distance between two successive oblong holes, measured in the longitudinal direction of the row, is twice the value of the difference between the dimension of the one bolt and that of the other bolt, measured in the span direction of the oblong holes.

Of course, it is possible to assign a second bolt or other bolts to each of the two rows of oblong holes, provided said bolts are necessary for load carrying reasons or space requirements. Bolts assigned to the same row are immoveable relative to each other, i.e. they cannot fall into the notches independently of each other, because a displacement in the direction of adjustment is necessary that is equal to the periodicity of this row. If, in contrast, the two bolts assigned to the same row can be forced to engage with the oblong holes independently of each other, then a distance between these bolts in the adjustment direction is advantageous that is equal to the distance between two successive oblong holes.

There is also the possibility of providing one row of oblong holes on the one side of the pair of bars or seat and the one row of oblong holes on the other side, especially if the locking system serves to lock an upper bar that is connected to the frame of the seat and belongs to a pair of bars, for the longitudinally adjustable seat to the bottom bar, connected to the motor vehicle.

The tolerance-induced play of the bolts in the oblong holes in their longitudinal direction can be eliminated in a simple manner by designing the section of the bolts engaging with the oblong holes conically and by selecting the overlapping of the oblong holes of the one row with that of the other row somewhat smaller than if the section, which engages with the oblong holes were designed conically, in that the overlapping is preferably equal to half the sum of the diameter. The slightly smaller overlapping ensures that the conical sections will rest against the ends of the oblong holes.

BRIEF DESCRIPTION OF THE DRAWINGS

In the following, the invention is explained in detail with reference to two embodiments shown in the drawings.

DETAILED DESCRIPTION OF THE INVENTION

Figure 1:
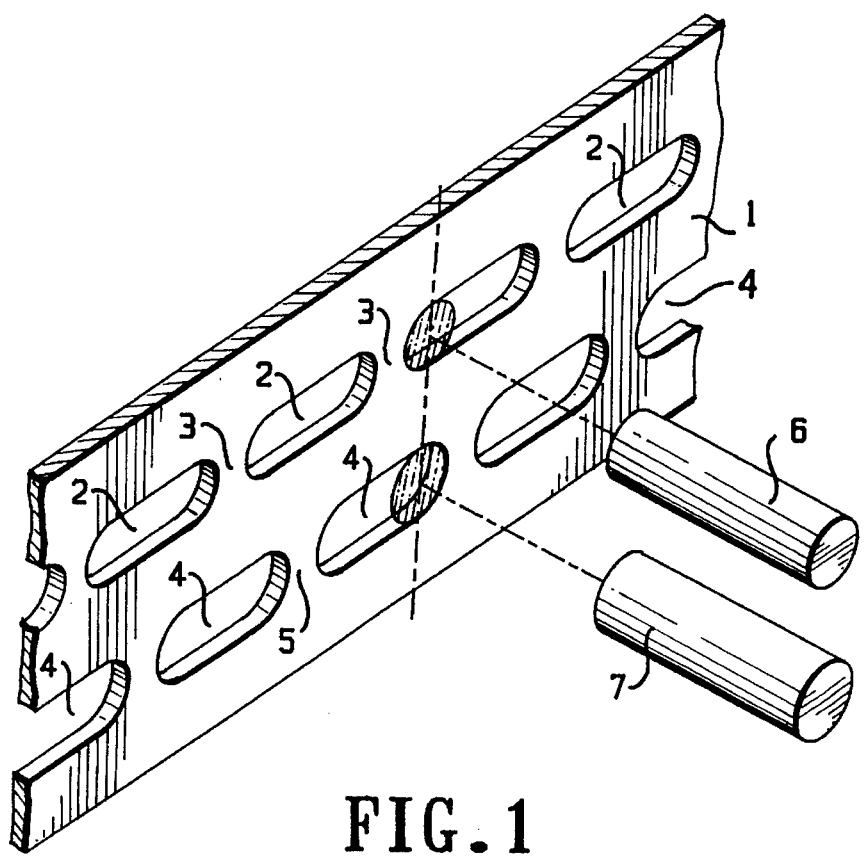
FIG. 1 is a fragmented perspective drawing of a first embodiment in the unbolted state.

A locking system, by means of which a car seat, which can be adjusted in the longitudinal direction of the seat, can be connected in selectable shape-locking positions to the structure of the motor vehicle, but which could also be assigned to another adjusting device of a car seat, for example a vertical adjusting device, exhibits a bar 1, extending in the seat's direction of adjustment. The illustrated section of the bar 1, which has the shape of a flat bar, is formed, for example, by the one leg of an angle bar, whose other leg is connected rigidly to the one of two components that can be moved relative to each other in the direction of adjustment. However, the bar 1 can also be a region of the bar of a pair of bars that connects the car seat to the structure of the motor vehicle so as to be longitudinally adjustable.

The bar 1 is provided with a linear row of first oblong holes 2 that extends in the direction of adjustment and all of whose oblong holes have the same size and a semicircular contour at the two ends. Furthermore, the distance between two successive first oblong holes 2 is equally large. Therefore, the web regions 3 separating the two adjacent first oblong holes 2 have the same shape and size.

In addition to the row defined by the first oblong holes 2, there is a row of second oblong holes 4, which also have the same shape and size and a semicircular contour at both ends.

Their length measured in the direction of adjustment is equal to the corresponding length of the first oblong holes. In addition, the distance between two successive second oblong holes 4 is also equal to the distance between two successive first oblong holes 2, so that the web regions 5, lying between the second oblong holes 4, have at their narrowest point the same dimension in the direction of adjustment as the web regions 3 at their narrowest point. In contrast, the width of the second oblong holes 4 that is measured at right angles to the direction of adjustment is greater than the width of the first oblong holes 2, and in particular by 25% in the embodiment.

The length of both the first oblong holes 2 and the second oblong holes 4 that is measured in the direction of adjustment is equal to the sum of the width of the first oblong holes 2, the second oblong holes 4 that is measured at right angles to the direction of adjustment and the width of the web regions 3 or 5, selected at their narrowest point, whereby this width is equal to twice the value of the difference from the width of the second oblong holes 4 that are measured at right angles to the direction of adjustment, and the corresponding width of the first oblong holes 2.

A first round bolt 6, which engages in its shape-locking position with one of the first oblong holes 2, is assigned to the row comprising the first oblong holes 2. Therefore, the diameter is adapted to the width of the first oblong holes 2 that is measured at right angles to the direction of adjustment and thus to the curvature of their semicircular ends.

A second round bolt 7 is assigned to the second oblong holes 4. This second round bolt 7, which can be moved into its locking position independently of the first round bolt 6, is engaged in shape-locking fashion with one of the second oblong holes 4 in said locking position. The diameter of said second round bolt is adapted to the width of the second oblong holes 4, said width being measured in the cross direction of said second oblong holes 4.

In the embodiment the distance between the first oblong holes 2 and the second oblong holes 4 that is measured at right angles to the direction of adjustment is equal to the width of the second oblong holes 4 that is measured in this direction.

Figure 2:
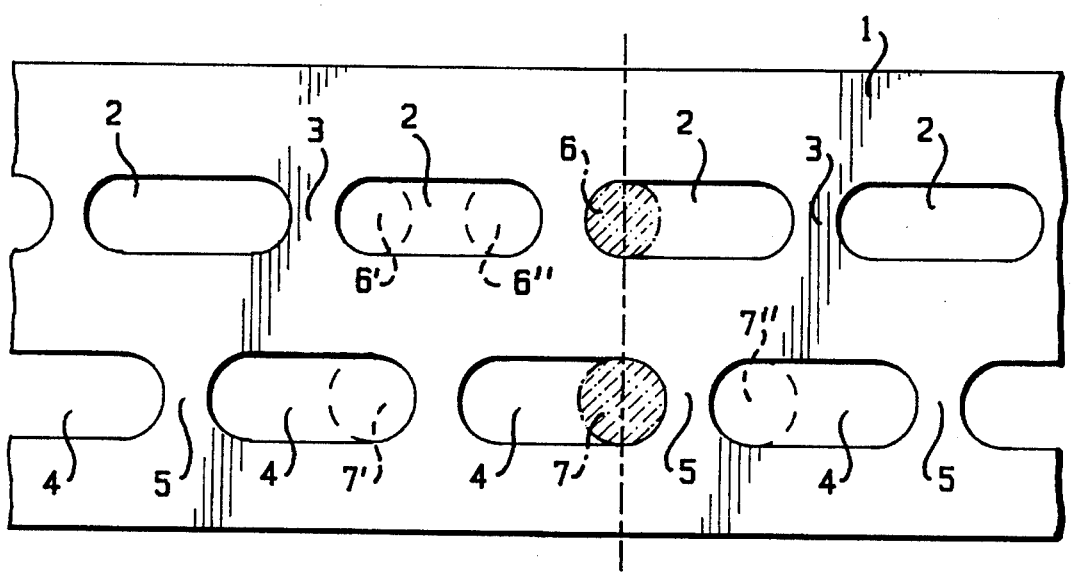
FIG. 2 is a top view of the component of the first embodiment provided with oblong holes and a sectional view of the two bolts, which are in the locking position.

As shown especially in FIG. 2, the first round bolt 6 and the second bolt 7 are arranged relative to each other and relative to the bar 1 so that a connecting line runs between their two longitudinal axes at right angles to the direction of adjustment. Thus, the two round bolts 6 and 7 are not offset against one another in the direction of adjustment. The offset of the second oblong holes 4 relative to the first oblong holes 2 in this direction is selected in such a manner that, when the first round bolt 6 rests against one end of one of the first oblong holes 2, the second bolt 6 rests against one end of one of the second oblong holes 4. Therefore, the first oblong holes 2 and the second oblong holes 4 overlap by an amount that is equal to the sum of the radii of the two round bolts 6 and 7.

In the embodiment the two round bolts 6 and 7 are slidable in the direction of their longitudinal axis, which is perpendicular to the longitudinal center line of the row defined by the respective oblong holes and are mounted in a guide, which is not illustrated and which is connected rigidly to that of the two parts that can be moved relative to each other in the direction of adjustment and with which the bar 1 is not connected. Correspondingly the second round bolt 7 is slidable longitudinally in a guide, which can be designed as one piece with the guide of the first round bolt 6 and is rigidly connected to that part with which the guide of the first round bolt 6 is also connected. Both round bolts 6 and 7 can be loaded, for example, with one prestressed spring each, which endeavors to hold them in the locking position. Against the force of these springs, the two round bolts 6 and 7 can be moved together out of the locking position by means of a common releasing device.

At this stage it depends on the position of the bar, on the one hand, and on the position of the two round bolts 6 and 7, on the other hand, whether, after being released by the releasing device, both round bolts 6 and 7, driven by the force of the spring, acting on them, can be moved into the locking position, as is the case in the position according to FIG. 2, or whether only one of the two round bolts can penetrate into one of the respective oblong holes. Locking is guaranteed by one of the two round bolts 6 and 7 in any position. If namely the second round bolt 7 is aligned with one of the web regions 4 and can, therefore, not move into its locking position, the first round bolt 6 is aligned with one of the first oblong holes 2. Correspondingly, when the first round bolt 6 is aligned with one of the web regions 3, the second round bolt 7 is aligned with one of the second oblong holes 4. Therefore, when one of the two round bolts 6 or 7 can drop into its locking position, only a small movement in the direction of adjustment is needed for the other round bolt to drop and then induce locking that is shape-locking or without play or at least virtually without play in both directions.

Naturally the round bolts 6 and 7 could also form the end segments of each pawl, which can be swivelled around an axis parallel to the row formed by the oblong holes. Furthermore, it is possible to assign to one row or both rows at least one additional round bolt 6', 6", 7' or 7", which can fall into its locking position either only jointly with the first round bolt or also independently of the same. If the bolts (6 and 6' or 7"), which are assigned to the same row, can be moved only jointly into the locking position, then between them there is a distance that is equal to the periodicity of the row of oblong holes, thus a distance that is equal to the sum of the dimension of the web region in this direction. If, however, the two bolts (6 and 6" or 7 and 7"), allocated to the same row, can be moved independently of each other, then it is advantageous, if they have a distance between them that is selected equal to the dimension of the web region that is measured in the direction of adjustment.

Figure 3:
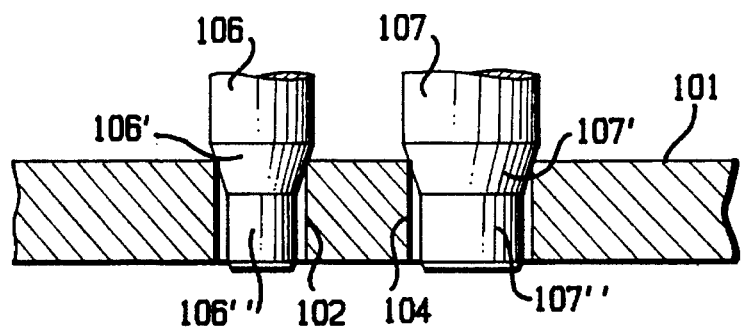
FIG. 3 is a cross sectional view of the second embodiment.
Figure 4:
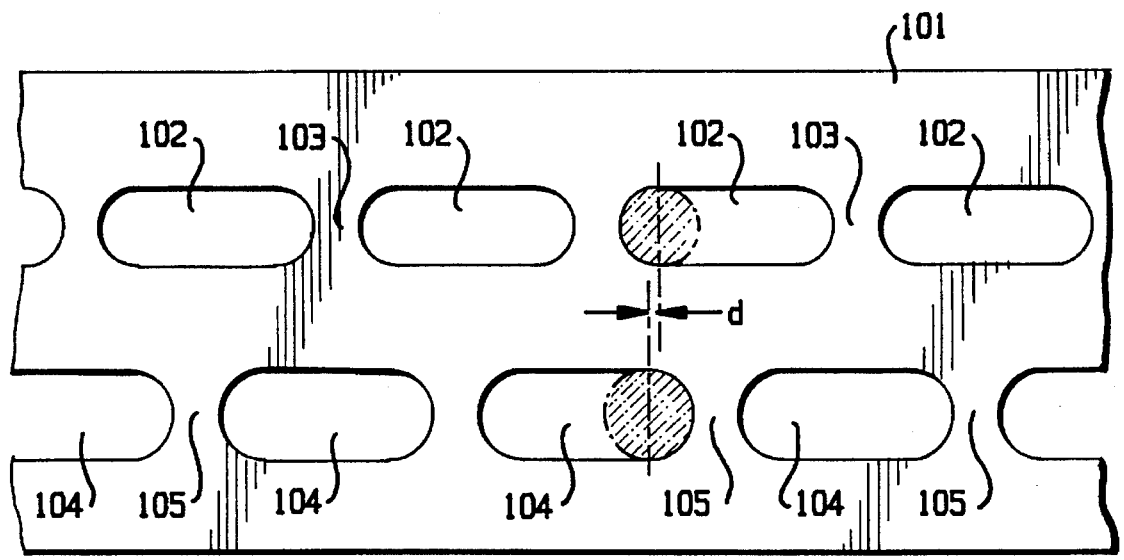
FIG. 4 is a fragmented top view of a bar of the second embodiment and a sectional view of the engaged section of the bolts.

The second embodiment shown in FIGS. 3 and 4 exhibits a bar 101, which is provided with a first, linear row of first oblong holes 102, which extend in the direction of adjustment and all of which have the same size and whose ends have a semicircular contour, and a second row of second oblong holes, all of which also have the same shape and size and whose ends have a semicircular contour, said second row extending parallel to this first row at a distance next to it. The oblong holes 102 are separated from each other by means of web regions 103; the oblong holes 104, by web regions 105. The length of the second oblong holes 104 is chosen equal to that of the first oblong holes 102; and the web regions 105 have at their narrowest point the same dimension in the direction of adjustment as the web regions 103 at their narrowest point. The width of the second oblong holes 104 that is measured at right angles to the direction of adjustment is greater than that of the first oblong holes 102, and in particular by 25% in the embodiment.

Therefore, the major distinction between bar 1 of the first embodiment and bar 101 lies in a different overlapping of the first oblong holes 102, on the one hand, and the second oblong holes 104, on the other hand. In the first embodiment, the overlapping is equal to the sum of the radii of the two round bolts 6 and 7, and thus also equal to the sum of the radii of the semicircular end segments of a first oblong hole 2 and a second oblong hole 4o In the second embodiment this overlapping is less by a small amount d than the sum of the radii of the semicircular sections of the first oblong hole 102 and a second oblong hole 104, as shown in FIG. 4. The amount can usually be less than 1 mm and be, for example, 0.25 mm.

The second embodiment has a small overlapping, because a circular cylindrical segment of the respective round bolts 106 or 107 does not engage with the oblong holes 102 and 104, but rather a conical segment 106' or 107'. This conical segment tapers in the direction of the free end of the round bolt. At the end exhibiting the largest diameter, the conical segment 106' of the round bolt 106 exhibits a diameter that is somewhat larger than the width of the first oblong holes 102 that is measured at right angles to the longitudinal direction. Correspondingly, the largest diameter of the conical segment 107' is somewhat greater than the width of the second oblong holes 104 that is measured at right angles to the longitudinal direction.

If, as in the embodiment, the cone angle of the conical segments 106' and 107' is chosen in such a manner that there is no self-locking, when this section engages with an assigned oblong hole, then it is necessary that a circularly cylindrical end segment 106" or 107" follows the end of the conical segment 106' or 107' that is smaller in diameter. Naturally the spring load of the bolts 106 and 107 is chosen so large that at forces arising normally in the direction of adjustment the conical segment is not pushed out of the oblong hole. When the forces become too great, as in the case of a crash, it must, however, be guaranteed that the locking remains effective. This state is ensured by the end segment 106" or 107", which remains engaged with the oblong hole even during a crash.

Since the overlapping of the first oblong holes 102 with the second oblong holes 104 is less by the value d than the sum of the radii of their semicircular end segments, the goal is reached that, independently of the tolerances, the conical segments 106' and 107' make contact with the crest area of the semicircular segments, thus their depth of penetration into the oblong holes is not limited by their longitudinal sides. Therefore, the usual tolerance-induced play is ruled out with the aid of the conical segments 106' and 107', thus preventing rattling noises that might otherwise occur during the trip.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that this invention be limited only to the extent required by the appended claims and the applicable rules of law.

What is claimed is:

1. Locking system for adjustable car seats comprising:
   a) a member having a direction of adjustment and a first row of notches, which extends in the direction of adjustment and wherein all said notches of said first row have the same dimensions and are spaced at equal intervals, each notch in said first row having a first and a second end,
   b) said member further including a second row of notches, which extends parallel to the first row and wherein said notches of said second row have in the direction of adjustment the same dimension and are the same distance from each other and are offset in the direction of adjustment relative to said notches of the first row, each said notch in said second row having a first end and a second end,
   c) a first locking body having a locking position in which said first locking body engages with one of said notches of the first row, and
   d) a second locking body, having a locking position in which said second locking body can be moved independently of the first locking body and in which said locking position said second locking body engages with one of said notches of the second row, and is arranged in such a manner relative to the first locking body that said second locking body strikes against said first end of one of said notches of the second row, when the first locking body strikes against said second end of one of said notches of the first row, wherein
   e) all of said notches of said first and said second rows are oblong holes extending in the direction of adjustment and having a width transverse to the direction of adjustment,
   f) the width of the oblong holes of the second row is greater than the width of the oblong holes of the first row, both said widths being measured at right angles to the direction of adjustment,
   g) at least a part of each of said first and second locking bodies that engages with the oblong holes is a bolt, each said bolt having a diameter.

2. Locking system, as claimed in claim 1, wherein said oblong holes of said first row and said oblong holes of said second row in the direction of adjustment overlap in accordance with half the sum of the diameter of said bolt of said first locking body and the diameter of said bolt of said second locking body in the part engaging with said oblong holes.

3. Locking system, as claimed in claim 1, wherein each of said first and said second row has a periodicity and said bolt and at least one additional bolt assigned to one of said rows are immovable relative to each other, the distance between said bolt and said at least one additional bolt in the direction of adjustment is identical to the periodicity of said row to which they are assigned.

4. Locking system, as claimed in claim 1, wherein there is an additional locking body assigned to each of said rows, which can be moved independently of the other locking body of the same row, a distance between two of said locking bodies assigned to the same one of said rows in the direction of adjustment is identical to a distance between two successive oblong holes.

5. Locking system, as claimed in claim 1, wherein said bolts have a cylindrical shape.

6. Locking system, as claimed in claim 5, wherein said oblong holes of said first row and said oblong holes of said second row in the direction of adjustment overlap in accordance with half the sum of the diameter of said bolt of said first locking body and the diameter of said bolt of said second locking body in the part engaging with said oblong holes.

7. Locking system, as claimed in claim 1, wherein each of said bolts has a free end and the part of said bolts which engages with said oblong holes is a cone tapering to said free end.

8. Locking system, as claimed in claim 7, wherein said oblong holes overlap and have overlapping parts having radii, said oblong holes of said second row are displaced in the direction of said first row relative to said oblong holes of said first row for overlapping said oblong holes of said first row, said oblong holes having a semicircular contour at said first and second ends thereof forming semicircular end parts, said overlapping of said oblong holes of the first row with said oblong holes of said second row is less than the sum of the radii of the overlapping end parts of said oblong holes of said first row and said second row, said end parts have a semicircular contour.

9. Locking system, as claimed in claim 7, wherein a cylindrical part of each of said bolts follow, a smaller end of said cone.

10. Locking system, as claimed in claim 9, wherein said oblong holes overlap and have overlapping parts having radii, said oblong holes of said second row are displaced in the direction of said first row relative to said oblong holes of said first row for overlapping said oblong holes of said first row, said oblong holes having a semicircular contour at said first and second ends thereof forming semicircular end parts, said overlapping of said oblong holes of the first row with said oblong holes of said second row is less than the sum of the radii of the overlapping end parts of said oblong holes of said first row and said second row, said end parts have a semicircular contour.

11. Locking system, as claimed in claim 1, wherein the distance between two successive said oblong holes of said first and of said second row is equal twice the value of a difference between the diameter of said bolt of said second locking body, which is assigned to said second row, and the diameter of said bolt of said first locking body, which is assigned to said first row.

12. Locking system, as claimed in claim 11, wherein said oblong holes of said first row and said oblong holes of said second row in the direction of adjustment overlap in accordance with half the sum of the diameter of said bolt of said first locking body and the diameter of said bolt of said second locking body in the part engaging with said oblong holes.

13. Locking system, as claimed in claim 11, wherein said bolts have a cylindrical shape.

14. Locking system, as claimed in claim 11, wherein each of said first and said second row has a periodicity and said bolt and at least one additional bolt assigned to one of said rows are immovable relative to each other, the distance between said bolt and said at least one additional bolt in the direction of adjustment is identical to the periodicity of said row to which they are assigned.

15. Locking system, as claimed in claim 11, wherein each of said bolts has a free end and the part of said bolts which engages with said oblong holes is a cone tapering to said free end.

16. Locking system, as claimed in claim 11, wherein there is an additional locking body assigned to each of said rows which can be moved independently of the other locking body of the same row and the distance between two of said locking bodies assigned to the same one of said rows in the direction of adjustment is identical to the distance between two successive oblong holes.

17. Locking system, as claimed in claim 1, wherein the bolts are round bolts and wherein said first and second ends of said oblong holes have a semicircular contour.

18. Locking system, as claimed in claim 17, wherein the distance between two successive said oblong holes of said first and of said second row is equal twice the value of the difference between the diameter of said bolt of said second locking body, which is assigned to said second row, and the diameter of said bolt of said first locking body, which is assigned to said first row.

19. Locking system, as claimed in claim 17, wherein said bolts have a cylindrical shape.

20. Locking system, as claimed in claim 17, wherein each of said first and said second row has a periodicity and said bolt and at least one additional bolt assigned to one of said rows are immovable relative to each other, the distance between said bolt and said at least one additional bolt in the direction of adjustment is identical to the periodicity of said row to which they are assigned.

21. Locking system, as claimed in claims 17, wherein each of said bolts has a free end and the part of said bolts which engages with said oblong holes is a cone tapering to said free end.

22. Locking system, as claimed in claim 17, wherein there is an additional locking body assigned to each of said rows which can be moved independently of the other locking body of the same row and the distance between two of said locking bodies assigned to the same one of said rows—has been in the direction of adjustment is identical to the distance between two successive oblong holes.

23. Locking system, as claimed in claim 17, wherein said oblong holes of said first row and said oblong holes of said second row in the direction of adjustment overlap in accordance with half the sum of the diameter of said bolt of said first locking body and the diameter of said bolt of said second locking body in the part engaging with said oblong holes.

* * * * *